Oct. 4, 1932.  A. G. M. MICHELL  1,880,353
JOURNAL BEARING
Original Filed Sept. 9, 1929   2 Sheets-Sheet 1
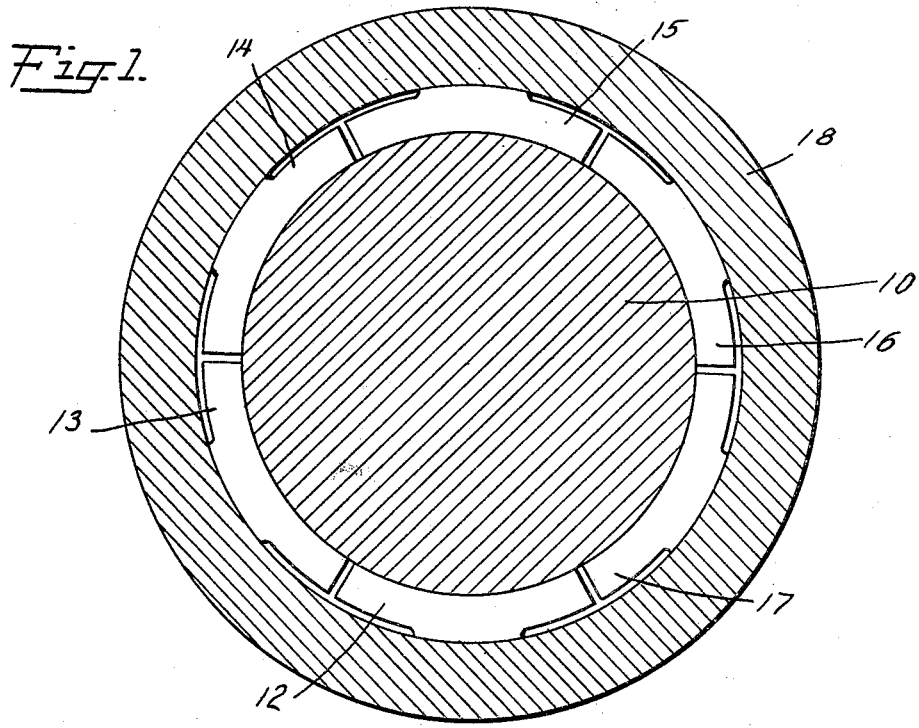
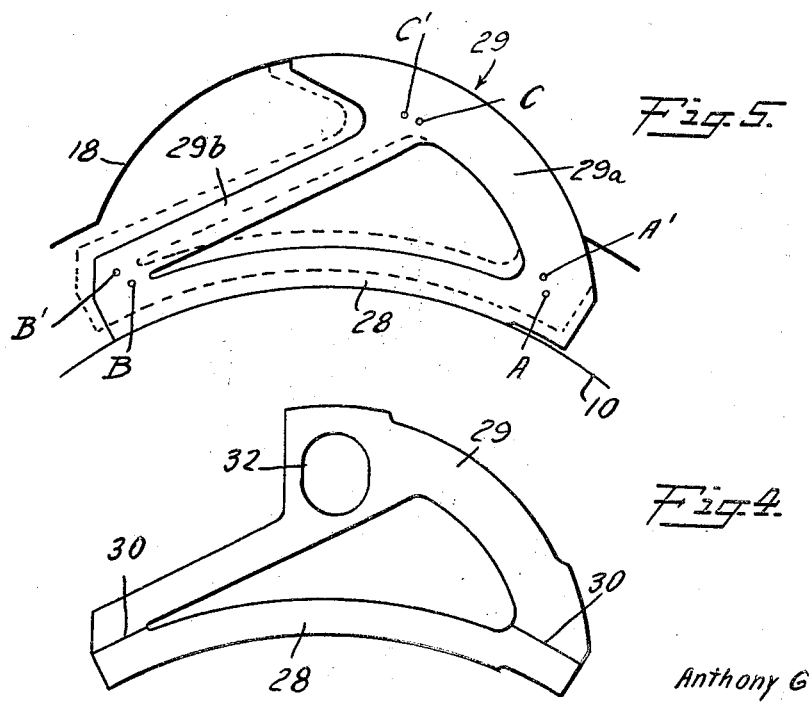
INVENTOR
Anthony G. M. Michell
BY
Marshall & Hawley
ATTORNEYS Oct. 4, 1932. A. G. M. MICHELL 1,880,353

JOURNAL BEARING

Original Filed Sept. 9, 1929 2 Sheets-Sheet 2

INVENTOR
Anthony G. M. Michell
BY
Marshall O. Hawley
ATTORNEYS

Patented Oct. 4, 1932

1,880,353

UNITED STATES PATENT OFFICE

ANTHONY G. M. MICHELL, OF MELBOURNE, AUSTRALIA

JOURNAL BEARING

Application filed September 9, 1929, Serial No. 391,310. Renewed July 8, 1932.

This invention relates to journal bearings. More specifically stated, the invention relates to journal bearings in which the journal is supported in pivoted bearing pads and such a bearing is illustrated in Michell Patent No. 1,617,719. Bearings of this type have been subject to certain difficulties, such as expansion by heating when under load.

This invention has for its salient object to provide an improved bearing of the type specified, so constructed and arranged that the expansion of certain parts thereof, due to heating, will not detract from nor interfere with the effective operation of the bearing.

Further objects of the invention will appear from the following specification taken in connection with the drawings, which form a part of this application, and in which Fig. 1 is a sectional elevation of a bearing of the type specified, showing the bearing as heretofore constructed;

Fig. 4 is an elevational view of one of the bearing pads showing a slightly modified form of construction; and Fig. 5 is a view similar to Fig. 4, illustrating diagrammatically the expansion of the bearing pad due to heating.

The invention briefly described consists of providing a bearing pad so constructed and arranged that the expansion of the pad due to heating does not interfere with the efficient operation of the bearing or cause the bearing pad to grip the journal or the supporting housing in which the pads are mounted.

Further details of the invention will appear from the following description.

In the bearing construction illustrated in Fig. 1, the journal or shaft 10 is supported against forces tending to displace the journal radially by a series of bearing pads 12, 13, 14, 15, 16 and 17 which are mounted and supported in a fixed housing 18. The housing may be formed as a continuous ring or may be split or divided to admit the journal. In either case, however, the housing is rigidly supported.

The bearing pads may be pivotally supported in the housing as the pad 12 illustrated in Fig 1, for the purpose of facilitating the lubrication as explained in Patent No. 1,617,719 above referred to.

In order to restrict or prevent radial displacement of the journal, it is usually necessary to limit the radial clearances between the journal and the pads and between the pads and the housing to relatively small magnitudes for admitting the necessary lubricating films. In the operation of the bearing, heat is generated by fluid friction in the film of lubricant between the rotating journal and the pads and such heat is ordinarily dissipated by conduction outwardly to the frame of the machine. The journal and the pads attain a higher temperature than the housing and consequently sometimes expand radially relatively to the housing to a greater extent than is permitted by the radial clearances. This, of course, interferes with the efficient operation of the bearing and sometimes results in seizing.

Figure 2:
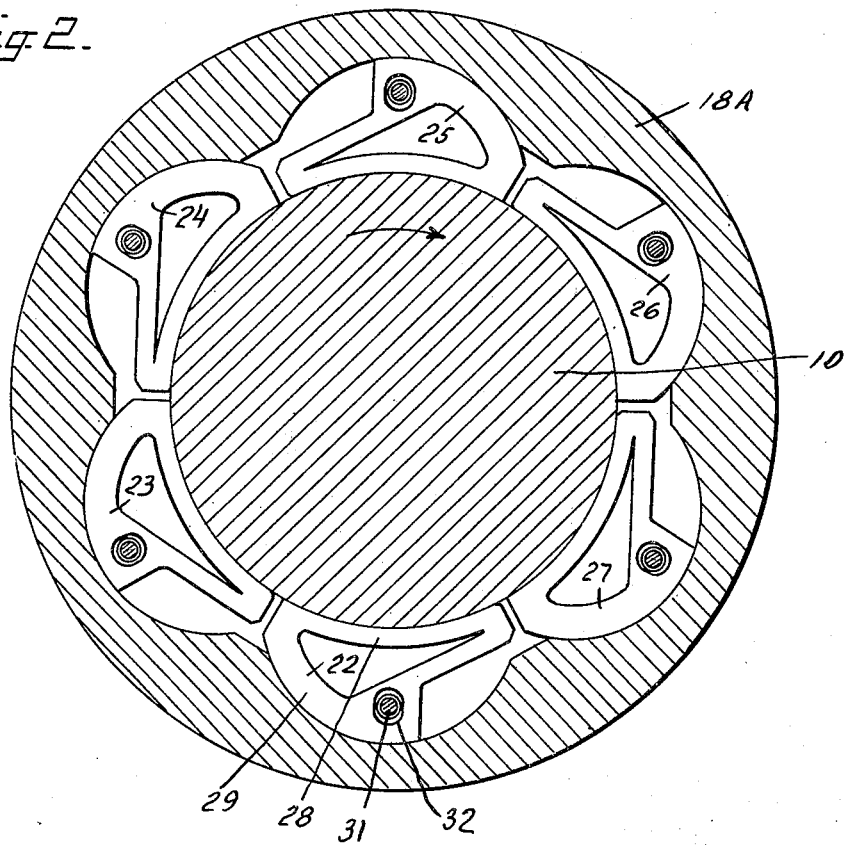
Fig. 2 is a transverse, sectional elevation similar to Fig. 1 but showing the improved construction of the bearing.

In the form of the invention illustrated in Fig. 2, the journal 10 is supported in a plurality of bearing pads 22, 23, 24, 25, 26 and 27, which in turn are carried by and supported in the housing 18A.

The bearing pads are shaped somewhat in the form of crescents, each pad being hollow and consisting of a cylindrical portion 28 adapted to engage the journal, and an outer portion 29 also having a cylindrical bearing surface engaging a cylindrical seat in the housing 18A.

The parts 28 and 29 of the pad may be formed integral or, if desired, as shown particularly in Fig. 4, may be formed of separate parts secured together in any suitable manner, as by welding, as shown at 30.

Figure 3:
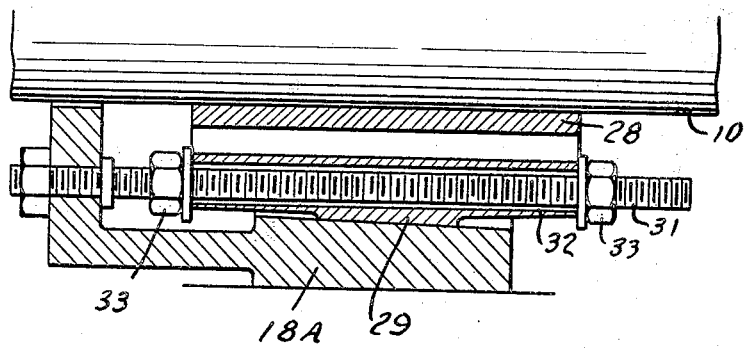
Fig. 3 is a detail sectional elevation taken at right angles to Fig. 2, showing one form of adjusting means for the bearing pads.

The outer surface of the part 29 is preferably arranged unsymmetrically with respect to the axes of the journal and pad, as shown in Fig. 2, in which the direction of rotation of the journal is indicated by an arrow. Furthermore, the portion 28 of the bearing pad is also arranged unsymmetrically for the purpose explained in detail in Patent No. 1,617,719 above noted. The surfaces formed on the parts 29 of the pads and the corresponding surfaces formed in the housing are preferably slightly inclined in the direction of the journal axis, as shown in Fig. 3, and means are provided for adjusting the radial clearance between the pad and the journal. Any desired adjusting means may be used, but that shown in Fig. 3 consists of a bolt 31 which extends through a hole 32 in the bearing pad, the hole being elongated radially, as shown in Fig. 2, to admit radial adjustment of the pad. Nuts 33 are carried by the bolt 32 and engage the sides of the pad. The bolts 31 are carried by the housing and when the nuts 33 are loosened the pads can be moved longitudinally on the bolts. The inclined surfaces of the pad and housing cause the pads to be adjusted toward or away from the axis of the journal as the pads are moved on the bolts. When adjusted to the desired position, the nuts can be tightened, thus limiting the clearance. Washers are preferably interposed between the nuts and pads and the nuts are not turned tight enough to prevent movement of the pads in the housing.

It should be understood that any other form of adjusting means may be used, if desired. For instance, instead of adjusting the pads, the housing itself could be formed in segments and adjusted toward and away from the axis of the journal.

In the form of the invention illustrated in Fig. 4, the two parts 28 and 29 of the bearing pad may be formed of metals having different coefficients of expansion, the inner part 28 having a higher coefficient than the outer part 29.

Fig. 5 illustrates somewhat diagrammatically the action of the bearing, due to heating. Owing to the transfer of the heat outwardly, the inner part 28 of each bearing pad assumes a higher temperature and expands to a greater extent circumferentially than the outer part 29. The outer part 29 may be considered as comprising two limbs or segments 29a and 29b meeting at C and connected to the part 29 at points A and B respectively.

For the purpose of considering the action of the pad due to heating, only the relative expansion of the parts need be considered, and the original lengths AC and BC of the parts 29a and 29b respectively may be regarded as remaining constant, while the length AB of the part 28 increases by an amount corresponding to the excess of its temperature over the temperature of the parts 29a and 29b. Thus, in Fig. 5, in which A', B' and C' represent the altered positions of the points A, B and C after expansion has taken place, the lengths A'C' and B'C' are shown respectively as equal to the lengths AC and BC, while the original length AB is increased to A'B' by the expansion due to heating. As a result of this expansion, the bearing pad is deformed or changes shape, taking the form indicated by the dotted lines in Fig. 5 and becoming on the whole of increased circumferential length, but reduced axial breadth. The part 29a will remain in contact with the coacting surface of the housing but the inner surface of the part 28 of the pad will be displaced outwardly, thus allowing for an outward radial expansion of the journal and for a general expansion of the pad as a whole, due to any excess in temperature of the pad over the temperature of the housing.

The effect brought out in the preceding paragraph may be increased by the construction shown in Fig. 4, in which, as above explained, the part 28 is formed of metal having a higher coefficient of expansion than the remaining portion of the pad. Because of this form of construction the elongation of the part 28 circumferentially of the journal will be increased or magnified.

From the foregoing description it will be clear that bearing pads constructed as described will continue to operate efficiently after expansion, due to heating, and the expansion of the bearing pads will take place in such directions as to permit the expansion of the journal without gripping the bearing pads.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A hollow bearing pad unit of generally triangular configuration, for use in journal bearing housings, comprising a curved section adapted to engage the journal and form a sector of a cylindrical bearing, and an outer section spaced from and fixedly connected to said curved section, said outer section having a surface adapted to seat against the housing.

2. A hollow bearing pad unit of generally triangular configuration, for use in journal bearing housings, comprising a cylindrical section adapted to engage the journal and form a sector of a cylindrical bearing, and an outer section spaced from and fixedly connected to said cylindrical section, said outer section having a surface to seat against the housing.

3. A hollow bearing pad unit of generally triangular configuration for use in a journal bearing housing and adapted to form a sector of a cylindrical journal bearing, said unit having integrally connected spaced bearing and supporting sections, said supporting section having a surface adapted to seat against the housing.

4. A hollow bearing pad unit of generally triangular configuration for use in journal bearing housings, comprising a curved section adapted to engage the journal and form a sector of a cylindrical bearing, and an arcuate outer section spaced from and fixedly connected to said curved section, said arcuate section having a surface adapted to seat against the housing.

5. A hollow bearing pad unit of generally triangular configuration for use in journal bearing housings, adapted to form a sector of a cylindrical journal bearing, said unit having spaced bearing and supporting sections, said sections being formed on metals having different coefficients of expansion, and said supporting section having a surface adapted to seat against the housing.

6. A hollow crescent shaped bearing pad unit of generally triangular configuration for use in a journal bearing housing, and adapted to form a sector of a cylindrical journal bearing, said unit having integrally connected spaced bearing and supporting sections, said supporting section having a surface adapted to seat against the housing.

7. A hollow bearing pad unit of generally triangular configuration for use in a journal bearing housing and adapted to form a sector of a cylindrical journal bearing, said unit having separated bearing and supporting sections formed of material having different coefficients of expansion, said supporting section having a surface adapted to seat against the housing.

8. A hollow bearing pad unit of generally triangular configuration for use in a journal bearing housing adapted to form a sector of a cylindrical journal bearing, said unit having separated bearing and supporting sections formed of material having different coefficients of expansion, the bearing section having a higher coefficient of expansion than the supporting sections, and said bearing section having a surface adapted to seat against the housing.

9. A hollow bearing pad unit of generally triangular configuration for use in a journal bearing housing and adapted to form a sector of a cylindrical journal bearing, said unit having an elongated relatively thin bearing section, and a supporting section fixedly connected thereto and spaced therefrom, said supporting section having a surface adapted to seat against the housing.

10. In combination, a housing, an annular series of bearing pads forming a cylindrical bearing surface for a journal, said pads having spaced bearing and supporting parts so constructed and arranged that the bearing parts will expand to a greater degree than the supporting parts, thus effecting a contraction in the radial dimensions of the pads.

11. A hollow bearing pad unit comprising a curved bearing section, a curved seating section having an end connected thereto adjacent an end of the bearing section, said sections being spaced from each other, and an additional section connecting said curved sections adjacent their other ends.

ANTHONY G. M. MICHELL.